April 25, 1933. C. A. ROGERS ET AL 1,905,242
HEAVY DUTY VEHICLE
Filed Aug. 4, 1930   4 Sheets-Sheet 1
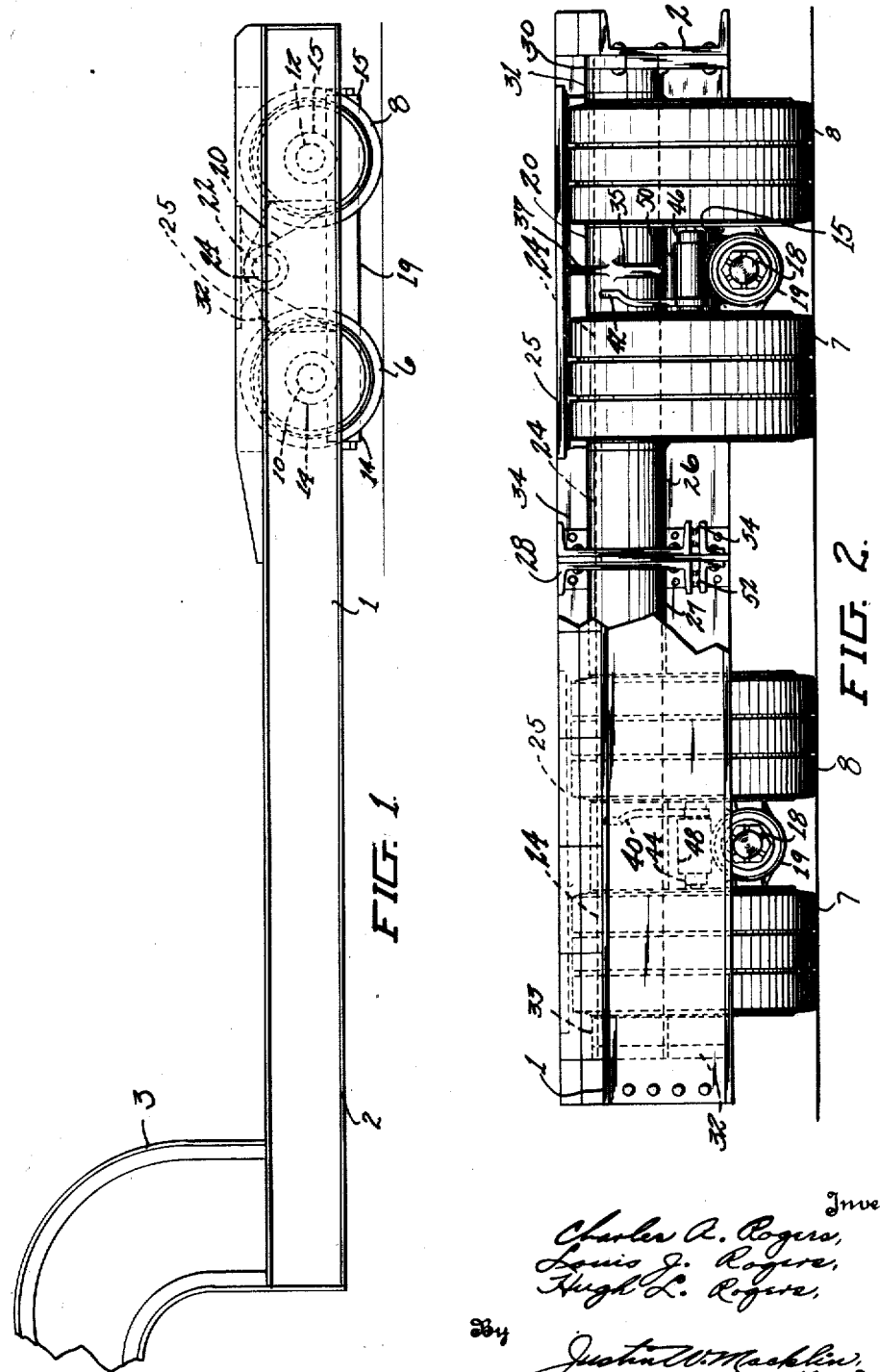

April 25, 1933.  C. A. ROGERS ET AL  1,905,242
HEAVY DUTY VEHICLE
Filed Aug. 4, 1930   4 Sheets-Sheet 2

Inventor
Charles A. Rogers,
Louis J. Rogers,
Hugh L. Rogers,
By Justin W. Macklin,
their Attorney Patented Apr. 25, 1933

1,905,242

UNITED STATES PATENT OFFICE

CHARLES A. ROGERS, LOUIS J. ROGERS AND HUGH L. ROGERS, OF ALBION, PENNSYLVANIA

HEAVY DUTY VEHICLE

Application filed August 4, 1930. Serial No. 472,808.

This invention relates to load carrying vehicles and is concerned particularly with heavy duty trailers adapted for carrying very large loads. Concurrently with the increase in the loads that are carried on the highways, most of the states have enacted statutes limiting the width of vehicles, the permissive load per inch of tire width, the load per axle and the overall length of the trailers and an attached motor vehicle.

Obviously, limitations in the width and length of the trailer prevent spreading the load over a large space so as to keep its center of gravity close to the roadway and as a result, the load quite often extends a considerable distance above the floor of the trailer. It is necessary, therefore, in order to decrease the overall height of the trailer and load so that it may pass under overhead structures, that the floor of the trailer be kept close to the road surfaces.

Further, due to these limitations in width and length of such vehicles, coupled with the size of the loads to be carried, it is necessary, in order to obtain stability, that the load bearing floor be kept very close to the road surface so that as the trailer tilts the resultant vertical force of the load and trailer through the center of gravity may fall more easily within the area defined by the wheels on the roadway. Such lowering of the load-bearing floor permits carrying of heavy loads with less danger of overturning than when the load is supported a considerable distance above the wheels.

The problem of supporting the floor of such vehicles close to the road surface and at the same time providing sufficient tire width and conforming to the other limitations above mentioned, has presented many difficulties.

The limitations in width and length make it necessary to retain the load at as nearly a horizontal position as possible, as a slight inclination of the load bearing floor not only redistributes the stresses and sets up severe strains on the frame and supporting trucks, but also tends to shift the load and increase the danger of its overturning.

As a result of the limitations in load per unit of tire width, and the overall width of the trailer, all of the tires must at all times engage the surface of the road. Otherwise it is very difficult to provide enough bearing surface. Due to the limitations in axle load, combined with the other limitations, it is necessary to use more than the usual number of axles and wheels.

With these problems in mind, one of the objects of our invention is a trailer for carrying very heavy loads, which is sufficiently limited in width and has sufficient tire surface in engagement with the road at all times to meet State requirements.

Another object of our invention is such a trailer which may be economically produced and in which the load carrying floor is close to the road surface.

Still another object of our invention is to support the trailer floor in such manner that the rise and fall of the supporting wheels, due to irregularities in the road surface, are considerably reduced before they are transferred to the trailer frame, thus permitting the floor to be retained in a more nearly horizontal position and less subject to sudden shocks of impact.

Still another object of our invention is to distribute the stresses resulting from the weight of the load and impacts against the wheels in such manner that the bending moments on the frame are relieved and twisting of the frame is practically eliminated.

A more specific object of our invention resides in the manner in which the frame is supported by the supporting trucks, the trucks and frame being so related that the load carrying floor need only to withstand small lateral stresses.

Another specific object resides in the manner of resisting lateral thrusts which arise as the supporting trucks negotiate short turns.

Another object resides in the manner of securing the trucks to the frame so that the bending moments normally arising from impacts against the wheels will be partially withstood by the supporting trucks, thus relieving the trailer frame from the action of such stresses.

Another specific object of our invention is an effective brake arrangement by which equalized braking pressure may be exerted on each of the wheels concurrently.

These, and other objects will become apparent from the following specification in which reference is made to the drawings by the use of numerals.

In the drawings—

Fig. 1 is a partial longitudinal view of a trailer embodying our invention.

Fig. 2 is an enlarged end elevation of the trailer shown in Fig. 1, part of the frame being cut away to show the supporting trucks.

Figure 3:
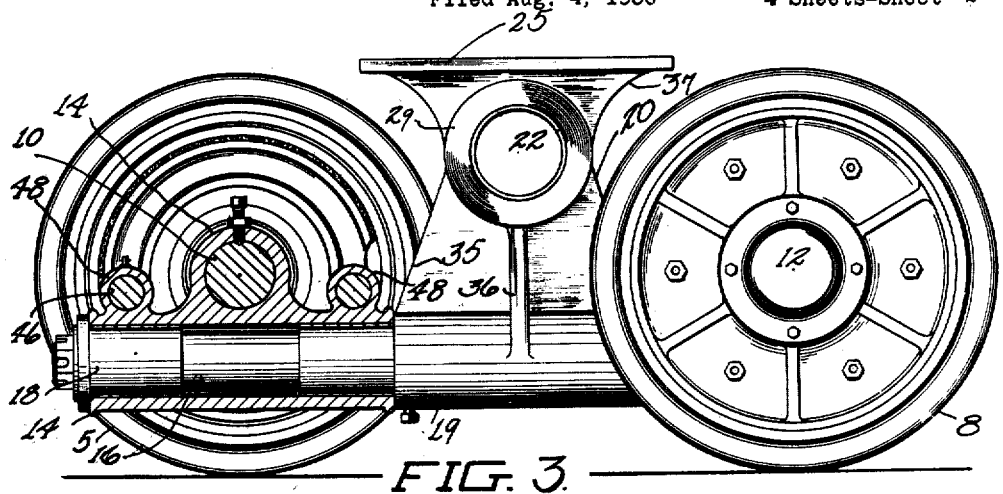
Fig. 3 is a side elevation of one of the trucks illustrated in Fig. 2, part thereof being shown in section for clarity in illustration.

Referring to the drawings, a trailer embodying the principles of our invention may include a frame 1 preferably comprised of a plurality of longitudinal channels or H-beams 2, forming the frame for the load bearing floor. The front end of the trailer is adapted to be supported on the rear end of a motor truck or supporting wheel assemblage. It is desirable that the motor truck and trailer be capable of being turned at very abrupt angles to each other for convenience in positioning the trailer for loading and unloading. To permit such action we provide a gooseneck or supporting member 3 on the front of the frame extending out over the rear end of the motor truck far enough to permit the truck to turn without jamming the frame 1. The frame should be composed of very heavy members and strong enough to carry a heavy load, 200 tons or more for example, while supported only at the front, as described, and at the rear on trucks later to be described.

Obviously, a frame for such a load may be made heavy enough to withstand the attendant severe stresses and torsion while loaded and in use, but only at very great expense and considerable weight. Therefore, for economy, we prefer to reduce the stresses affecting the frame by reducing the movement transmitted thereto consequent upon movement of the wheels over irregular surfaces, or around curves, or upon impacts against the wheels.

Figure 4:
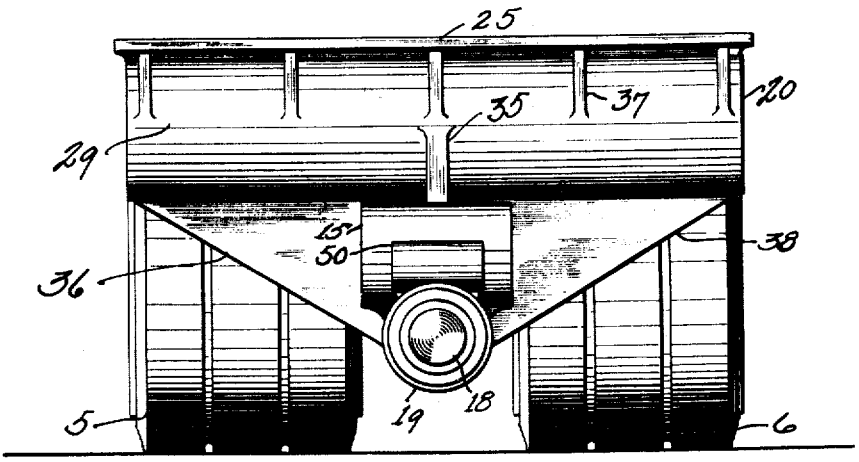
Fig. 4 is a right end elevation of the truck shown in Fig. 3, the right end wheels being removed.
Figure 5:
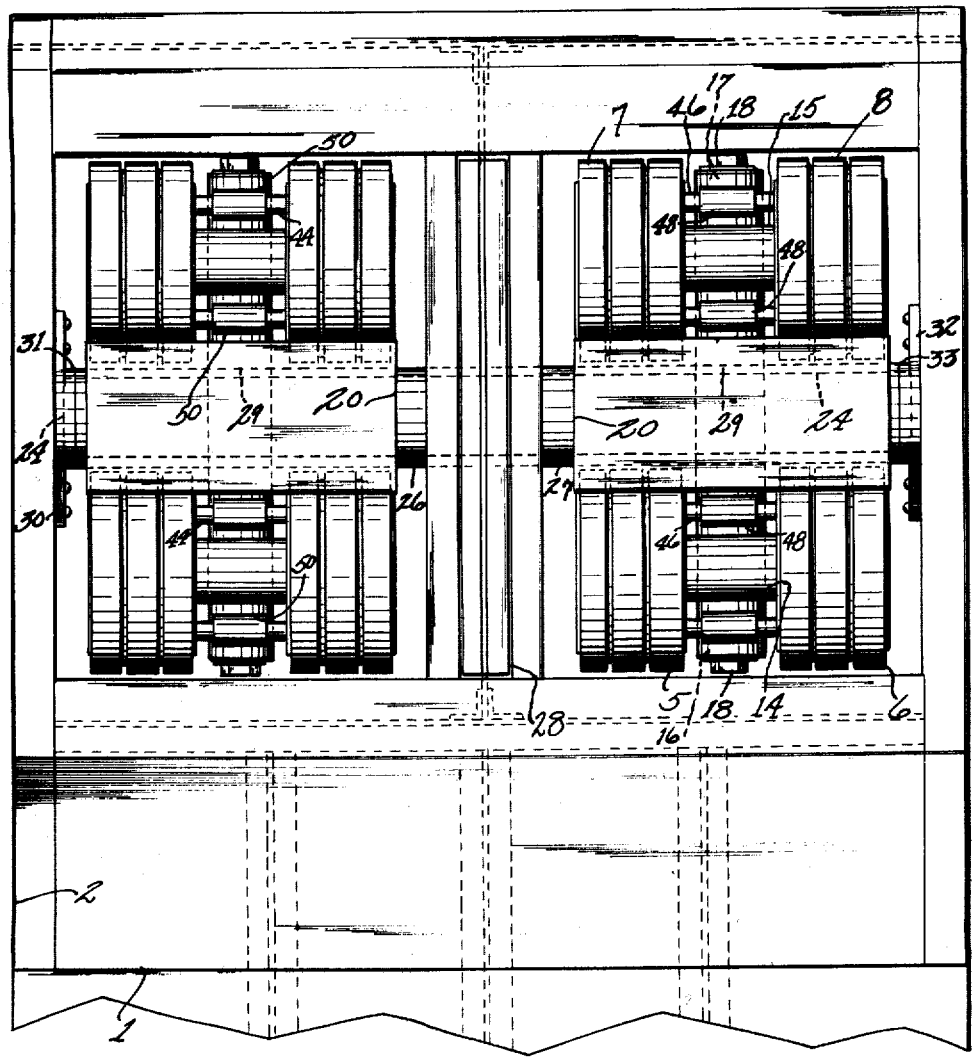
Fig. 5 is a partial plan view of a trailer such as illustrated in Fig. 1, showing the relative position of the supporting trucks.

To accomplish these results, we find it desirable to use trucks such as ilustrated in Figs. 3 to 5. Since the trucks may be the same, a description of one suffices for all.

In the form there illustrated two trucks are provided, although any number of such trucks may be used. Each truck includes a pair of front wheels 5 and 6 and a pair of rear wheels 7 and 8. The wheels 5 and 6 are supported in axial alignment transversely of the trailer on a heavy supporting axle 10, and the rear wheels 7 and 8 may be supported in like manner on a transverse axle 12. These axles in turn are mounted in supporting members or housings 14 and 15. These housings are provided with bores 16 and 17 transverse to the axles 10 and 12, and preferably extend from the front to the rear of the wheels with which associated. The housings 14 and 15 are rockably mounted on a rigid beam 18. The beam 18 in turn is mounted in a comparatively long sleeve-like housing 19 of a heavy supporting member 20, which is provided with a transverse bore 22 adapted to rockably engage a rigid shaft or beam 24 which supports the frame of the trailer in a manner later to be described.

It should be noted that the beam 18 supports the axles 10 and 12 from the underside so that the beam 24 may be kept comparatively close to the plane of the wheel axles 10 and 12, thus materially lowering the trailer floor. Further, the front and rear pairs of wheels are relatively close together so that they may rock through a large angle about the beam 24 without striking the trailer floor or frame and may more easily negotiate turns. In order that the wheels may rock about the shaft 24 without interference by the vehicle floor, and also to provide a floor surface above the wheels and shaft 24 while maintaining the axis of the shaft close to the upper limits of the longitudinal side frame members, a table or platform 25 is provided on top of the supporting member 20. The table is preferably cast integral with the sleeve 29 and is rockable with the member 20 as this member rocks about the shaft 24. This table not only reinforces the member 20, but also overhangs the forward and rearward wheels of the truck assemblage, as better illustrated in Fig. 3, and is disposed so that its upper surface lies substantially at the level of the bearing surface of the adjacent floor of the vehicle, as illustrated in Figs. 1 and 2, thus forming a movable floor portion of the vehicle. By providing such a movable floor portion above this part of truck assemblage, machines or other cargo loaded onto the trailer may be rolled or moved thereacross without the necessity of laying temporary flooring or planking to bridge the space. This beam 24, as better illustrated in Fig. 2, should extend from the outside of one truck to the outside of the other, and, for efficiency, should engage the trailer frame at the sides and in the center. This may be done by passing the beam through suitable bearing members on a central longitudinal supporting member 28 secured to the trailer. Similar housings may be provided at the ends of the shaft and secured on the trailer frame.

The shaft or beam 24 is preferably positioned so that it lies between the upper and lower limits of the frame members, close to the upper surface thereof. Suitable openings may be provided in the central longitudinal member 28 to permit passage of the shaft 24 through this member, the frame member being reinforced about such opening if necessary. In order to retain the trucks in position on the beam 24 spacing collars, such as 26 and 27 may be used.

The ends of the beam 24 may be secured to the side longitudinal frame members by means of supporting plates 30 and 32, having reinforced sleeves 31 and 33, respectively, to receive the beam. A similar support could be used to secure the beam 24 to the central supporting member, thus permitting the use of a short separate beam for each truck. In such an arrangement, the central longitudinal beam member 28 of the trailer is subject to heavy stresses, due to the lever action of the short beam, while by using one long shaft or beam 24, these stresses are not transmitted to the frame. In fact, by using one long beam, the frame is subject to no more stresses than if it were resting on three separate supporting posts, the bending moments being withstood by the beam 24.

By positioning the beam close to the load carrying floor lateral forces resulting from tilting of the trailer act at very short lever arms relative to the supporting beam and consequently the moments laterally about the points of support on the shaft are so reduced as to be almost negligible.

Figure 6:
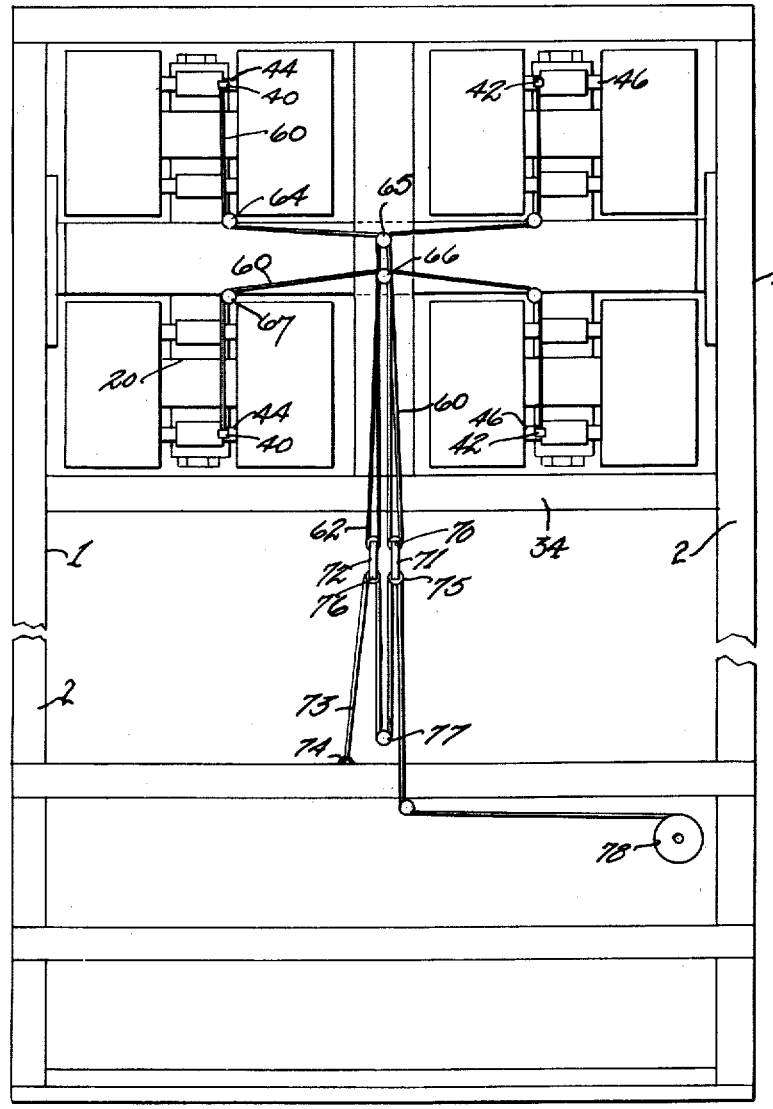
Fig. 6 is a diagrammatic plan view of a trailer such as illustrated in Fig. 1 showing the brake connections and equalizing mechanism.

It should be noted that only the side longitudinal members 2 of the trailer frame extend to the rear end of the trailer and that the other members terminate short of the end and are secured to a transverse beam 34, such as illustrated in Figs. 5 and 6. The member 28 is secured to beam 34 and rear transverse frame member to stiffen the shaft or beam 24 between the trucks.

In this manner, the entire width of the trailer, except for the central longitudinal member 28, may be utilized in wheel space and the wheels are free to tilt about their longitudinal axes unobstructed by longitudinal members lying along or close to the longitudinal axis of the truck. Furthermore, the trucks themselves may rock unimpeded on the transverse axes.

As any wheel of the truck strikes an obstruction, the truck tends to turn about a vertical axis midway between the four wheels.

A similar action occurs as the trailer negotiates turns on the roadway. This is caused by the slippage or creeping of the wheels transverse to the direction of movement, due to the fact that they are not pivotally mounted about a vertical axis so as to follow accurately the turn in the road. Under heavy loads on comparatively short turns, this tendency to turn about such an axis becomes very great and causes a large movement about the vertical axis described.

By using a single long beam, as described, obviously this tendency may be withstood by a small reactionary thrust of the frame delivered at the end of a comparatively long lever arm. The sleeve 29 is preferably long so as to further strengthen the shaft 24 and render it more rigid.

By this arrangement, the front and rear wheels of each supporting truck are free to rock longitudinally relative to the trailer frame, and the wheels of each set are free to rock laterally of the frame. Thus all of the wheels may engage an irregular road surface at all times, without materially changing the floor level or tilting the floor. For instance, of the wheel 5 should engage the depression, the center of the shaft 18 is lowered only one-half the distance that the wheel lowers and the center of the shaft 24 is lowered only half the amount that the shaft 18 is lowered.

As a result, the maximum rise or fall of the trailer frame directly over the support is only one-fourth what it would be were the wheels rigidly connected to the frame. This in itself tends to reduce the side thrust upon the wheel or trucks. However, more greatly to reduce the side thrust and prevent stresses on the trailer frame, it is desirable that the shaft itself be comparatively heavy and rigid, and engage the trailer frame as described at the outside of and between the sets of trucks. In this manner side thrust on the trucks is largely taken up in the shaft itself, and is resisted by the slight stress in the frame acting at the end of a comparatively long lever arm.

Furthermore, by carrying a rigid shaft across the trailer frame the entire frame acts as a continuous beam and the stresses are directed in a natural direction into the heavy casting 20 through which they finally are concentrated on the longitudinal shafts 18. The member 20 itself, as mentioned, is preferably very heavy and is provided with upper and lower web portions 37 and 35, and may be also strengthened by webs such as 36, thus forming substantially a constant strength beam.

Since the weight of such a loaded trailer is exceedingly great, the truck or motive means is usually insufficient to stop it, once it is in motion. It must therefore, be provided with brakes. In order to furnish proper brakes for such a trailer without reducing the necessary tire width, we prefer to form the brake drums inside of the tire rim of the wheel, the outer circumference of the brake drum forming practically a portion of wheel rim, as illustrated in Fig. 3. In this manner the wheels may be brought very close together and yet a wide heavy brake shoe may be used.

To insure proper brakig action, the braking pressure applied to the brakes should be equalized and each of the eight wheels should be provided with brakes. The brakes may be actuated by cams, such as 44 and 46, rockable by levers 40 and 42 and mounted in housings 48 and 50, preferably molded on the housings 14 and 15.

The levers 40 and 42, in turn, may be operated by cables from a winding drum or the cable may be directly operated from the usual air brake mechanism. Rollers, such as 52 and 54, are provided where desirable to guide the cables and render operation easy. The cables may be operably connected to the source of power through an equalizing mechanism, as illustrated in Fig. 6. As there diagrammatically illustrated, levers 40 are actuated by a cable 60, illustrated by the double lines. For clearness, the cable 62 which operates the levers 42 is shown as a solid black line. Since the action of each is the same, the action of the cable 60 only will be described.

This cable is secured to the levers 40 of the rear wheel brakes, passes through suitable pulleys 64 and 65 through pulley 70 and back through pulleys 66 and 67 to the lever 40 of the front wheel brakes. The pulleys 65 and 66 may be fastened to one of the beam members of the frame, the pulleys 64 and 67 being secured on the member 20. Suitable openings are provided, where necessary, in the frame members to permit passage of the cables. The pulley 70 is mounted in a floating bracket 71. Obviously, as a pull is exerted on this bracket, the tension on both portions of the cable 60 is equalized and both levers 40 re eive the same pull. A similar bracket 72 operates the cable 62 and equalizes the pull on levers 42.

To obtain an equal pull on both brackets so as to equalize the pull on all brakes, we provide a cable 73, one end of which is secured to the frame of the trailer, as at 74. The floating brackets 71 and 72 are provided with pulleys 75 and 76 respectively. The cable 73 passes from its point of connection with the frame through pulley 76, and then through a pulley 77, secured to the frame. A suitable opening is provided in the frame to permit passage of the cable therethrough. The cable then passes through pulley 75 to a suitable source of power, such as a winding drum 78. This drum may be operated by any suitable power or hand means.

However, it is desirable in many cases to pull and slack the cable 73 by the usual air operated braking means, and we do not wish to limit ourselves to the winding drum given by way of illustration. Obviously, two air operated braking means could be used, each directly operating each of the cables 60 and 62 respectively.

It is apparent that in a trailer such as described, a very high percentage of the width of the trailer is utilized in tire space and that the length of the truck is not necessarily great, so that the wheels may rock through a considerable angle without engaging the truck floor. Further, the trailer is capable of carrying exceedingly heavy loads under severe conditions of use and may be stopped effectively at comparatively high speeds. Again, the axle load is only one half that of a four wheel trailer loaded with an equal load.

While we have described a form of our invention by way of illustration, we do not intend to limit it to the specific structure illustrated, but intend to include various forms of vehicles embodying the principles of our invention.

We claim:—

1. In a heavy duty vehicle, a frame, two four-wheeled trucks for supporting one end of the frame, each of said trucks comprising a housing having a longitudinal bore and a transverse bore, a shaft in said longitudinal bore extending past the front and rear of said housing, a pair of wheels rockably mounted upon each end of said shaft, said housing extending transversely from said longitudinal bore past the inner faces of each of said wheels, a shaft in said transverse bore rockably supporting said housing and engaging said trailer frame on opposite sides of said housing.

2. In a heavy duty vehicle, a frame, two four-wheeled trucks for supporting one end of the frame, each of said trucks comprising a housing having a longitudinal bore and a transverse bore, a shaft in said longitudinal bore extending past the front and rear of said housing, a pair of wheels rockably mounted upon each end of said shaft, said housing extending transversely from said longitudinal bore, a transverse shaft extending through the bore of both of said housings and rockably supporting said housings, means to retain said trucks in spaced relation on said shaft, and means to support said frame on said shaft at separated points.

3. In a heavy duty vehicle, a pair of supporting trucks therefor, each of said trucks comprising a housing rockably connected to the vehicle by a transversely extending pivot, said pivot engaging said vehicle frame at separated points between and outside of said trucks, and each of said housings having a bore extending longitudinally of the vehicle and positioned below the axis of the transverse pivot, a shaft in said longitudinal bore, wheels connected to said shaft in front and rear of said transverse pivot and rockable laterally of the vehicles about said shaft, and each of said housings extending transversely of the vehicle in each direction from the longitudinal bore beyond the mid portion of the wheels.

4. In a heavy duty vehicle, a frame including a plurality of longitudinal beams and longitudinal side frame member, and trucks for supporting said frame, each of said trucks being connected to said frame by a transversely extending pivot means secured to the side frame members, the pivotal axis of said pivot means being disposed substantially in the plane defined by the top surfaces of said longitudinal side frame members, each truck including a longitudinal member spaced below the transverse pivot, pairs of wheels mounted on each end of said longitudinal member for rocking laterally thereabout, the axis of rotation of said wheels being disposed above the rocking axis thereof, whereby lateral stresses on the frame and the height of the frame above the supporting surface are reduced.

5. In a heavy duty vehicle, a pair of supporting trucks therefor, each of said trucks comprising a housing rockably connected to said vehicle by a transversely extending pivot member engaging the vehicle on opposite sides of the truck with which associated, each of said housings including a longitudinally extending member spaced below the axis of said pivot member, and wheels mounted on each end of said longitudinal member and rockable about the longitudinal axis thereof, said housing extending transversely of the vehicle and terminating laterally substantially at the outer limits of the truck, and the axis of rotation of the wheels being positioned above the axis of the longitudinal member.

6. In a heavy duty vehicle, a pair of supporting trucks therefor, each of said trucks comprising a housing having a transverse sleeve, a transverse shaft rockably supporting said sleeve and connected to said vehicle between and outside of said trucks, each of said housings including a longitudinally extending member positioned below the transverse shaft and a pair of wheels mounted on each end of said longitudinal member and rockable laterally thereabout, the axis of rotation of said pairs of wheels being spaced above the said longitudinal axis, said transverse sleeve extending laterally of the vehicle in each direction from the longitudinally extending member as far as the mid portion of the wheels.

7. In a heavy duty vehicle a frame and supporting trucks therefor, each of said trucks comprising a member rockably connected to the frame by a transversely extending pivot, and having forwardly and rearwardly extending axle means, housings rockably mounted one on each end of said axle means, each of said housings having a longitudinal bore for engaging an end of the axle means and a transverse bore spaced vertically from the longitudinal bore for receiving a transversely extending wheel axle, a wheel axle in said transverse bore and wheels on said wheel axle, brakes for the wheels, a smaller transverse bore on said housing spaced longitudinally from the wheel axle bore, and brake operating means supported in said smaller bore and operatively connected with the brakes of said wheels whereby rocking of the wheels and housings and rocking of said first mentioned member will not affect the action of the brake operating means.

8. In a heavy duty vehicle including a floor supporting a frame, a supporting truck therefor, said truck comprising a member rockably secured to said frame by a transversely extending pivot, wheels carried by said member and positioned in front and in the rear of said transverse pivot, a table carried on said members and lying close to the floor level of the vehicle and forming part of the floor thereof, said table being rockable with said member, whereby the wheels may rock about the transverse pivot without striking that portion of the floor formed by the table.

9. In a heavy duty vehicle, a frame and two four wheel trucks supporting an end of said frame, each of said trucks comprising a housing having a longitudinal member and a transverse member vertically spaced from said longitudinal member, wheels mounted on each end of the longitudinal member in front and rear of the transverse member, and rockable about said longitudinal member the axis of rotation of said wheels being spaced above the rocking axis thereof, said transverse member extending to each side of the longitudinal member to the outermost lateral limits of the wheels, and pivotal means rockably supporting said transverse member and engaging the frame at each side of said truck beyond the lateral limits of said wheels.

10. In a heavy duty vehicle having a floor supporting frame and a floor thereon, a truck for supporting said frame, said truck comprising a transverse member rockably secured to the frame by a transversely extending pivot, a longitudinally extending beam carried by said transverse member, pairs of wheels mounted on said beam, one pair of said wheels being disposed in front of the transverse pivot and one pair being disposed in the rear of said pivot, a platform on said transverse member, said platform forming part of the floor of the vehicle and extending laterally of the vehicle to the faces of the wheels outermost from said longitudinal beam and being rockable with said transverse member, whereby the pairs of wheels may rock about the transverse pivot without hindrance by that part of the floor formed by said platform.

11. In a heavy duty vehicle having a floor supporting frame and a floor thereon, a truck for supporting said frame, said truck comprising a transverse member rockably secured to the frame by a transversely extending pivot, a longitudinally extending beam on said member, pairs of wheels mounted on said beam, one pair of said wheels being disposed in front of the transverse pivot and one pair being disposed in the rear of said pivot, a platform carried by and rockable with said transverse member and forming part of the floor of said vehicle, said platform overhanging, forwardly and rearwardly, portions of said wheels adjacent thereto and extending transversely of the vehicle the width of said truck.

12. In a heavy duty vehicle, a supporting truck comprising a longitudinal member, forward and rearward wheel axles mounted on the respective ends of said longitudinal member and rockable laterally thereabout, wheels on said axles, a transverse member rigid with the longitudinal member, a pivot securing the transverse member to the vehicle frame at each side of said truck, said transverse member extending laterally from each side of the longitudinal member a distance substantially as great as the distance of said wheel axles from the transverse member, and engaging the pivot at its outermost ends, whereby lateral stresses on the wheels may be resisted efficiently and severe concentrated stresses on the pivot are eliminated.

In testimony whereof, we hereunto affix our signatures.

CHARLES A. ROGERS.
LOUIS J. ROGERS.
HUGH L. ROGERS.

CERTIFICATE OF CORRECTION.

Patent No. 1,905,242.                                April 25, 1933.

CHARLES A. ROGERS, ET AL.

It is hereby certified that error appears in the printed specification of the above numbered patent requiring correction as follows: Page 4, line 100, claim 1, for "trailer" read "vehicle"; page 5, line 6, claim 4, for "member" read "members"; and that the said Letters Patent should be read with these corrections therein that the same may conform to the record of the case in the Patent Office.

Signed and sealed this 1st day of August, A. D. 1933.

M. J. Moore.

(Seal)                                Acting Commissioner of Patents.

supporting frame and a floor thereon, a truck for supporting said frame, said truck comprising a transverse member rockably secured to the frame by a transversely extending pivot, a longitudinally extending beam on said member, pairs of wheels mounted on said beam, one pair of said wheels being disposed in front of the transverse pivot and one pair being disposed in the rear of said pivot, a platform carried by and rockable with said transverse member and forming part of the floor of said vehicle, said platform overhanging, forwardly and rearwardly, portions of said wheels adjacent thereto and extending transversely of the vehicle the width of said truck.

12. In a heavy duty vehicle, a supporting truck comprising a longitudinal member, forward and rearward wheel axles mounted on the respective ends of said longitudinal member and rockable laterally thereabout, wheels on said axles, a transverse member rigid with the longitudinal member, a pivot securing the transverse member to the vehicle frame at each side of said truck, said transverse member extending laterally from each side of the longitudinal member a distance substantially as great as the distance of said wheel axles from the transverse member, and engaging the pivot at its outermost ends, whereby lateral stresses on the wheels may be resisted efficiently and severe concentrated stresses on the pivot are eliminated.

In testimony whereof, we hereunto affix our signatures.

CHARLES A. ROGERS.
LOUIS J. ROGERS.
HUGH L. ROGERS.

CERTIFICATE OF CORRECTION.

Patent No. 1,905,242.     April 25, 1933.

CHARLES A. ROGERS, ET AL.

It is hereby certified that error appears in the printed specification of the above numbered patent requiring correction as follows: Page 4, line 100, claim 1, for "trailer" read "vehicle"; page 5, line 6, claim 4, for "member" read "members"; and that the said Letters Patent should be read with these corrections therein that the same may conform to the record of the case in the Patent Office.

Signed and sealed this 1st day of August, A. D. 1933.

M. J. Moore.

(Seal)     Acting Commissioner of Patents.

CERTIFICATE OF CORRECTION.

Patent No. 1,905,242.                                                                                  April 25, 1933.

CHARLES A. ROGERS, ET AL.

It is hereby certified that error appears in the printed specification of the above numbered patent requiring correction as follows: Page 4, line 100, claim 1, for "trailer" read "vehicle"; page 5, line 6, claim 4, for "member" read "members"; and that the said Letters Patent should be read with these corrections therein that the same may conform to the record of the case in the Patent Office.

Signed and sealed this 1st day of August, A. D. 1933.

M. J. Moore.

(Seal)                                                         Acting Commissioner of Patents.